(12) United States Patent
Seok

(10) Patent No.: US 10,562,267 B2
(45) Date of Patent: Feb. 18, 2020

(54) WATERPROOF AND MOISTURE PERMEABLE FABRIC, AND MANUFACTURING METHOD THEREFOR

(71) Applicant: AMOGREENTECH CO., LTD., Gimpo-si (KR)

(72) Inventor: Jong Su Seok, Suwon-si (KR)

(73) Assignee: AMOGREENTECH CO., LTD., Gyeonggi-do (KR)

( * ) Notice: Subject to any disclaimer, the term of this patent is extended or adjusted under 35 U.S.C. 154(b) by 266 days.

(21) Appl. No.: 15/612,493

(22) Filed: Jun. 2, 2017

(65) Prior Publication Data

US 2017/0266919 A1 Sep. 21, 2017

Related U.S. Application Data

(62) Division of application No. PCT/KR2015/013793, filed on Dec. 16, 2015.

(30) Foreign Application Priority Data

Dec. 18, 2014 (KR) .................. 10-2014-0183192
Dec. 10, 2015 (KR) .................. 10-2015-0176117

(51) Int. Cl.
 *B32B 7/14* (2006.01)
 *D06M 17/04* (2006.01)
 (Continued)

(52) U.S. Cl.
 CPC ............ *B32B 7/14* (2013.01); *B32B 5/022* (2013.01); *B32B 5/024* (2013.01); *B32B 5/26* (2013.01);
 (Continued)

(58) Field of Classification Search
 CPC .... D04H 1/4382; D04H 1/4374; D04H 1/728;
 D06M 10/025; Y10T 442/659; Y10T 442/66; Y10T 442/671; Y10T 442/696; Y10T 442/55; A41D 31/02; B32B 27/12; B32B 2307/724; B32B 2307/7265; B32B 2305/38; B32B 2307/728; B32B 2307/75; B32B 7/14; B32B 5/02; B32B 5/26; B32B 5/022; B32B 5/024; B32B 2262/04; B32B 2262/0238; B32B 2262/023;
 (Continued)

(56) References Cited

U.S. PATENT DOCUMENTS

| | | | | |
|---|---|---|---|---|
| 5,631,074 A | * | 5/1997 | Herlihy, Jr. ............ | A41D 31/02 442/35 |
| 5,834,384 A | * | 11/1998 | Cohen .................. | D06M 10/025 442/382 |
| 2014/0287643 A1 | * | 9/2014 | Nozaki ................... | B32B 5/02 442/311 |

FOREIGN PATENT DOCUMENTS

| KR | 20010009775 | 2/2001 |
|---|---|---|
| KR | 20050085441 | 8/2005 |

(Continued)

OTHER PUBLICATIONS

International Search Report—PCT/KR2015/013793 dated Mar. 30, 2016.

*Primary Examiner* — Camie S Thompson
(74) *Attorney, Agent, or Firm* — Cantor Colburn LLP

(57) ABSTRACT

Provided is a breathable waterproof fabric including: a fabric substrate; a surface modified layer formed on a bonding surface of the fabric substrate; a dot adhesive member transferred to the surface modified layer; and a membrane bonded to the fabric substrate by the dot adhesive member.

5 Claims, 11 Drawing Sheets

(51) Int. Cl.
 D06M 17/10 (2006.01)
 B32B 5/02 (2006.01)
 B32B 5/26 (2006.01)
(52) U.S. Cl.
 CPC ............ D06M 17/04 (2013.01); D06M 17/10 (2013.01); *B32B 2250/02* (2013.01); *B32B 2250/03* (2013.01); *B32B 2250/20* (2013.01); *B32B 2262/02* (2013.01); *B32B 2262/023* (2013.01); *B32B 2262/0238* (2013.01); *B32B 2262/0246* (2013.01); *B32B 2262/0261* (2013.01); *B32B 2262/0284* (2013.01); *B32B 2262/0292* (2013.01); *B32B 2262/04* (2013.01); *B32B 2307/724* (2013.01); *B32B 2307/728* (2013.01); *B32B 2307/7265* (2013.01); *B32B 2307/75* (2013.01); *B32B 2437/00* (2013.01)
(58) Field of Classification Search
 CPC ........ B32B 2262/0284; B32B 2262/02; B32B 2262/0261; B32B 2262/0246; B32B 2250/02; B32B 2250/20; B32B 2437/00; D01D 5/00; D01D 5/0023; D01D 5/003; D01D 5/0084
 USPC ................ 106/772, 775, 780, 797; 427/538; 442/381, 382, 392, 414, 159, 602, 674; 156/272.6
 See application file for complete search history.

(56) References Cited

FOREIGN PATENT DOCUMENTS

| | | |
|---|---|---|
| KR | 20110110643 | 10/2011 |
| KR | 101106679 | 1/2012 |
| KR | 20140061127 | 5/2014 |
| KR | 20140122005 | 10/2014 |

* cited by examiner

WATERPROOF AND MOISTURE PERMEABLE FABRIC, AND MANUFACTURING METHOD THEREFOR

CROSS-REFERENCE TO RELATED APPLICATIONS

This application is a divisional application of PCT Application No. PCT/KR2015/013793 filed on Dec. 16, 2015, which claims priority to and the benefit of Korean Application No. 10-2014-0183192 filed on Dec. 18, 2014 and Korean Application No. 10-2015-0176117 filed on Dec. 10, 2015, in the Korean Patent Office, the entire contents of which are incorporated herein by reference.

TECHNICAL FIELD

The present invention relates to a breathable waterproof fabric, and more particularly, to a breathable waterproof fabric capable of improving a bonding strength between a fabric substrate and a membrane and a breathable efficiency, in which a transferred dot adhesion member is used and a surface modified layer is formed on a bonding surface of the fabric substrate, to thereby bond the fabric substrate and the membrane, and a method of manufacturing the same.

BACKGROUND ART

Generally, breathable waterproof fabrics are used to make clothes and play a role of discharging the moisture inside the clothes and preventing the external moisture from flowing into the clothes.

In recent years, interest in health and leisure activities has been increasing, and functional breathable waterproof fabric materials have been applied to various fields, and the breathing function is emphasized more and more in a high-class and well-being boom.

Breathable waterproof fabrics are applied to outdoor wears for mountain climbing such as climbing clothes, outdoor clothes and sleeping bags, and outdoor activities and their application ranges are expanding.

Water is not penetrated into the breathable waterproof fabrics while the sweat coming from the human body is vaporized and discharged to the outside of the breathable waterproof fabrics. As a result, clothes made of the breathable waterproof fabrics are comfortable in a wearing sense.

Waterproof materials are classified into three materials such as PTFE (polytetrafluoroethylene) films, polyester films, and PU (polyurethane) lamination. Gore-Tex (which is a waterproof, breathable fabric membrane and registered trademark of W. L. Gore and Associates) includes PTFE films and is currently leading the world's breathable waterproof fabric market. However, new materials that can replace existing breathable waterproof materials continue to be developed.

Korean Patent Registration Publication No. 10-1106679 discloses a technology of manufacturing breathable waterproof fabrics in which a polyurethane nanofiber web is thermally compressed with a raw fabric on which a liquid-phase adhesive is sprayed wherein polyurethane nanofiber web comprises polyurethane nanofibers having an average diameter of 1,000 nm or less and part of the polyurethane nanofibers is a moisture-curing polyurethane nanofiber.

However, such a raw fabric can facilitate a bonding process with the raw fabric by lowering the shrinkage ratio of the polyurethane nanofiber web at room temperature. However, by spraying the liquid-phase adhesive on the raw fabric, distribution of uneven spraying of the liquid-phase adhesive in the raw fabric is obtained, and thus the breathing efficiency is not uniform and the liquid-phase adhesive is impregnated into the raw fabric, thereby interfering with the breathing such as discharging of the sweat.

DISCLOSURE

Technical Problem

The present invention has been made in view of the problems of the prior art, and an object of the present invention is to provide a breathable waterproof fabric in which a fabric substrate and a membrane are bonded by using a transferred dot adhesive member to thereby prevent deformation of a pattern of the dot adhesive member, improve breathing efficiency, and enhance the adhesive strength therebetween, and a method of manufacturing the same.

Another object of the present invention is to provide a breathable waterproof fabric capable of enhancing the adhesive strength between a fabric substrate and a membrane by bonding a dot adhesive member to a surface modified layer formed on a bonding surface of the fabric substrate, and thus increasing breathable waterproof efficiency, and a method of manufacturing the same.

Another object of the present invention is to provide a breathable waterproof fabric capable of quickly bonding a dot adhesive member to a surface modified layer of a fabric substrate in a state where surface modification is maximally preserved, to thereby prevent the dot adhesion member from peeling off from the fabric substrate, and a method of manufacturing the same.

Technical Solution

According to an aspect of the present invention, there is provided a breathable waterproof fabric comprising: a fabric substrate; a surface modified layer formed on a bonding surface of the fabric substrate; a dot adhesive member transferred to the surface modified layer; and a membrane bonded to the fabric substrate by the dot adhesive member.

Preferably but not necessarily, the dot adhesive member may be formed of a material selected from the group consisting of a polyamide-based resin, a polyester-based resin, a polyurethane-based resin, a polyolefin-based resin, an ethylene vinyl acetate (EVA)-based resin, a polyester-based resin, and a polyvinyl chloride (PVC)-based resin.

Preferably but not necessarily, the membrane may be formed by laminating nanofibers obtained by electrospinning a spinning solution in which a polymer material and a solvent are mixed.

Preferably but not necessarily, the dot adhesive member may be a plurality of dot-shaped adhesives arranged in a matrix pattern in a mutually regularly spaced relationship.

Preferably but not necessarily, the dot-shaped adhesives each may have a diameter of 100 μm to 500 μm, the distance between the dot-shaped adhesives may be 100 μm to 400 μm, and the thickness of the dot adhesive member may be 30 μm to 50 μm.

According to another aspect of the present invention, there is provided a breathable waterproof fabric comprising: a first fabric substrate; a surface modified layer formed on a bonding surface of the first fabric substrate; a dot adhesive member transferred to the surface modified layer and whose one surface is bonded to the surface modified layer; a membrane bonded to the other surface of the dot adhesive member; an adhesive web bonded to the membrane and provided with pores; and a second fabric substrate bonded to the adhesive web.

Preferably but not necessarily, the adhesive web may be a hot-melt web, and a weaving density of the second fabric substrate may be lower than that of the first fabric substrate.

According to another aspect of the present invention, there is provided a method of manufacturing a breathable waterproof fabric, the method comprising: forming a surface modified layer on a bonding surface of a first fabric substrate; transferring a dot adhesive member to the surface modified layer; bonding one surface of the dot adhesive member to the surface modified layer of the first fabric substrate; and bonding the membrane to the other surface of the dot adhesive member.

Preferably but not necessarily, after bonding the membrane to the other surface of the dot adhesive member, the method may further comprise bonding a second fabric substrate to the membrane with an adhesive web having pores.

Preferably but not necessarily, the surface modified layer may be formed by a corona treatment process or a plasma treatment process.

Preferably but not necessarily, the surface modified layer may be formed by performing an irradiation process of irradiating a corona discharge to the first fabric substrate wherein the corona discharge is generated by feeding the first fabric substrate to a processing roll and applying a high frequency or a high voltage between the processing roll and a discharge electrode of a corona discharging unit.

Preferably but not necessarily, the method may perform transferring the dot adhesive member to the surface modified layer by guiding the first fabric substrate irradiated with the corona discharge by a guide roll.

Preferably but not necessarily, the transferring the dot adhesive member to the surface modified layer may comprise: transferring the dot adhesive member to a transfer auxiliary film; and transferring the dot adhesive member transferred to the transfer auxiliary film to the surface modified layer of the first fabric substrate.

According to another aspect embodiment of the present invention, there is provided a method of manufacturing a breathable waterproof fabric, the method comprising: transferring a dot adhesive member to a transfer auxiliary film; transferring the dot adhesive member transferred to the transfer auxiliary film to a fabric substrate; and bonding the membrane to the dot adhesive member.

Preferably but not necessarily, a melt index of the dot adhesive member may be 5 $cm^3$/10 min to 500 $cm^3$/10 min.

Preferably but not necessarily, the membrane may be a nanofiber web formed by laminating nanofibers obtained by electrospinning a spinning solution in which a polymer material and a solvent are mixed.

Preferably but not necessarily, the size of the pores of the nanofiber web may be 0.8 μm or less, and an accumulative amount of the nanofibers may be 3 gsm to 15 gsm.

Advantageous Effects

In the present invention, by bonding the fabric substrate and the membrane with the transferred dot adhesive member, it is possible to prevent deformation of the pattern of the dot adhesive member and reduce a bonding area between the fabric substrate and the membrane, to thereby increase an area of performing a breathing function to thus improve breathing efficiency.

In addition, in the present invention, since a micro dot-shape dot adhesive member is bonded to the fabric substrate and the membrane, the adhesive strength may be improved.

In the present invention, there is an advantage that the surface modified layer is formed on the bonding surface of the fabric substrate to improve the bonding strength of the dot adhesive member, thereby increasing the adhesive strength between the fabric substrate and the membrane.

In the present invention, a corona discharge is irradiated to a fabric substrate to form a surface modified layer on the fabric substrate, and then a dot adhesive member is transferred and bonded to the surface modified layer, by guiding the fabric substrate with a guide roll. Accordingly, it is possible to quickly bond the dot adhesive member to the surface modified layer of the fabric substrate in a state where surface modification is preserved at maximum, to maximize the adhesive force between the fabric substrate and the dot adhesive member to thereby prevent the dot adhesive member from peeling off from the fabric substrate, and shorten a manufacturing process time.

BEST MODE

Hereinafter, embodiments of the present invention will be described in detail with reference to the accompanying drawings.

Figure 1:
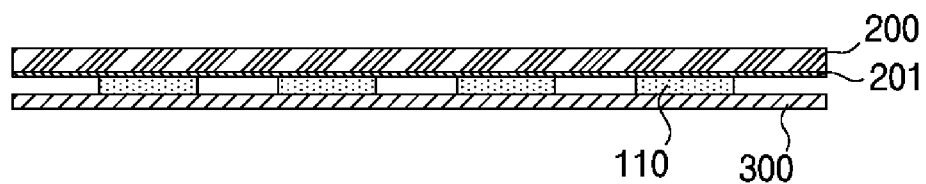
FIG. 1 is a cross-sectional view of a breathable waterproof fabric according to a first embodiment of the present invention.

Referring to FIG. 1, a breathable waterproof fabric according to a first embodiment of the present invention includes: a fabric substrate 200; a surface modified layer 201 formed on a bonding surface of the fabric substrate 200; a dot adhesive member 110 transferred to the surface modified layer 201 and whose one surface is bonded to the surface modified layer 201; and a membrane 300 bonded to the other surface of the dot adhesive member 110.

In this embodiment of the present invention, a surface modified layer 201 whose one surface is physically chemically modified is formed on the bonding surface of the fabric substrate 200, the dot adhesive member 110 is transferred and bonded to the surface modified layer 201, and then the membrane 300 is bonded to the dot adhesive member 110, to thereby improve the adhesion strength between the fabric substrate 200 and the membrane 300.

Therefore, the breathable waterproof fabric according to the embodiment of the present invention can prevent delamination between the fabric substrate 200 and the membrane 300 even if physical pressure is repeatedly applied by washing or cleaning. In addition, even if delamination occurs between the fabric substrate 200 and the membrane 300, most of the dot adhesive material 110 maintains the adhesive force. Therefore, there is no concern about a loss of function of the membrane 300 due to delamination.

The bonding surface of the fabric substrate 200 is subjected to a physical surface modification and a chemical surface modification in which a polar functional group is generated, so that the surface of the fabric substrate 200 is subjected to surface modification with excellent wettability, to thus form a surface modified layer and improve the adhesive strength of the dot adhesive member 110. Here, the physical surface modification is performed by modifying scratches, irregularities, or the like on the bonding surface of the fabric substrate in the course of performing the surface modification process. The physical surface modification increases the adhesion area of the dot adhesive member 110 to thus heighten the adhesive strength.

In addition, the chemical surface modification can be done in a variety of ways, for example, surface modification using corona discharge can be used. The surface modification process using the corona discharge may cause electrons or ions of high energy to collide with the surface of the fabric substrate 200, in order to generate a polar functional group together with the physical surface modification according to the corona discharge, to thereby form radicals or ions on the surface of the fabric substrate 200. Ozone, oxygen, nitrogen, moisture and the like may be reacted with these radicals or ions on the surface of the fabric substrate 200, to introduce a polar functional group such as a carbonyl group, a carboxyl group, a hydroxyl group or a cyano group, thereby chemically modifying the surface of the surface modified layer 201. When the surface modified layer 201 is modified chemically in this way, adhesiveness, printability, coating properties, deposition characteristics, and the like due to the improvement in hydrophilicity can be improved.

Figure 4A:
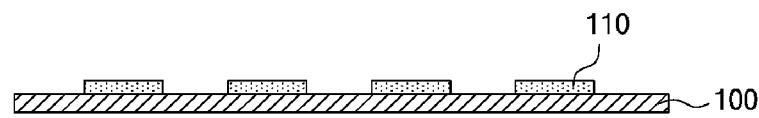
FIGS. 4A and 4B are cross-sectional views illustrating a method of transferring and bonding a dot adhesive member according to the present invention.
Figure 4B:
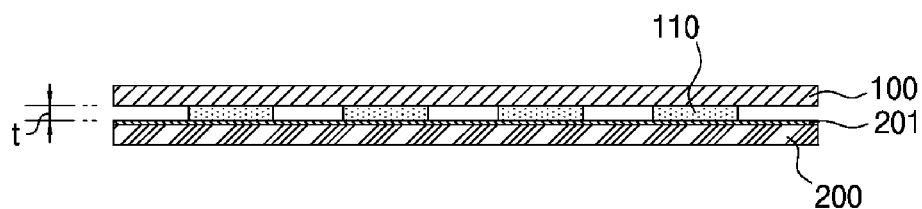

The dot adhesive member 110 includes a plurality of circular or polygonal dot-shaped adhesives arranged in a matrix-like pattern spaced apart from one another regularly. Referring to FIGS. 4A and 4B, the dot adhesive member 110 is first transferred to the transfer auxiliary film 100 so as to be transferred to the surface modified layer 201 of the fabric substrate 200 as a mutually regularly spaced adhesive pattern. Then, the transfer auxiliary film 100 is put on the bonding surface of the fabric substrate 200 and the dot adhesive member 110 is transferred to the surface modified layer 201 of the fabric substrate 200. Accordingly, the dot adhesive member 110 can be transferred and bonded to the surface modified layer 201 of the fabric substrate 200, without deforming the pattern of the adhesives.

Preferably, the dot adhesive member may be formed of a material selected from the group consisting of a polyamide-based resin, a polyester-based resin, a polyurethane-based resin, a polyolefin-based resin, an ethylene vinyl acetate (EVA)-based resin, a polyester-based resin, and a polyvinyl chloride (PVC)-based resin.

Here, the melting point of the dot adhesive member 110 is preferably 150° C. or less, and the melt index thereof is preferably 5 cm$^3$/10 min to 500 cm$^3$/10 min.

That is, when the melt index is less than 5 cm$^3$/10 min, the adhesion force of the dot adhesive member 110 with the fabric substrate 200 and the membrane 300 is deteriorated. When the melt index exceeds 500 cm$^3$/10 min, the melted dot adhesive member 110 penetrates into the fabric substrate 200 and the membrane 300, and thus the water-resistant pressure is lowered.

The fabric substrate 200 is a front fabric of the breathable waterproof fabric, and is exposed to the outside to directly affect the appearance of the clothes. Accordingly, the fabric substrate 200 should have the weaving structure of a relatively high density. For example, the fabric substrate 200 includes all materials for fabricating casual suits, sports suits, etc., as raw fabrics.

When the breathable waterproof fabric is worn, the membrane 300 performs a substantial breathable waterproof function of passing moisture vapor of sweat discharged from the human body and discharging it to the outside of the fabric, and blocking the liquid permeating into the human body from outside the fabric.

In some embodiments, in order to perform the breathable waterproof function, the membrane 300 may be used as a nanofiber web having a fine pore structure formed by accumulating nanofibers made of a polymer material.

That is, the membrane 300 is formed by electrospinning a spinning solution in which a polymer material and a solvent are mixed to produce nanofibers, and laminating the nanofibers.

Here, the electrospinning method applied to the present invention may employ any one of general electrospinning, air-electrospinning (AES), centrifugal electrospinning, and flash-electrospinning.

The polymer material used in the present invention may employ a material that can be electrospun, for example, a hydrophilic polymer and a hydrophobic polymer. In addition, one or more of these polymers may be used alone or in combination as the polymer material used in the present invention.

The polymer material usable in the present invention is not particularly limited as long as it is a resin that can be dissolved in an organic solvent for electrospinning and is capable of forming nanofibers by electrospinning. For example, the polymer material may include: polyvinylidene fluoride (PVdF), poly (vinylidene fluoride-co-hexafluoropropylene), perfluoropolymers, polyvinyl chloride or polyvinylidene chloride, and co-polymers thereof; polyethylene glycol derivatives containing polyethylene glycol dialkylether and polyethylene glycol dialkyl ester; polyoxide containing poly (oxymethylene-oligo-oxyethylene), polyethylene oxide and polypropylene oxide; polyacrylonitrile co-polymers containing polyvinyl acetate, poly (vinyl pyrrolidone-vinyl acetate), polystyrene, polystyrene acrylonitrile co-polymers, polyacrylonitrile (PAN), and polyacrylonitrile methyl methacrylate co-polymers; and polymethyl methacrylate and polymethyl methacrylate co-polymers, and a mixture thereof.

Examples of the usable polymer material may include: aromatic polyester such as polyamide, polyimide, polyamide-imide, poly (meta-phenylene iso-phthalamide), polysulfone, polyether ketone, polyethylene terephthalate, polytrimethylene terephthalate, and polyethylene naphthalate; polyphosphazenes such as polytetrafluoroethylene, polydiphenoxy phosphazene, and poly {bis [2-(2-methoxyethoxy) phosphazene]}; polyurethane co-polymers including polyurethane and polyether urethane; cellulose acetate, cellulose acetate butyrate, cellulose acetate propionate, and the like.

Among the above polymer materials, PAN, polyvinylidene fluoride (PVdF), polyester sulfone (PES) and polystyrene (PS) may be used alone or a mixture of polyvinylidene fluoride (PVdF) and polyacrylonitrile (PAN), or a mixture of PVDF and PES, and a mixture of PVdF and thermoplastic polyurethane (TPU) may be used.

Therefore, the polymer usable in the present invention is not particularly limited to thermoplastic and thermosetting polymers that may be electrospun.

The polymer material in the spinning solution when making the spinning solution is preferably 5 wt % to 22.5 wt %.

If the content of the polymer material is less than 5 wt %, it is difficult to form a fibrous phase and the polymer material is not spun but sprayed to form particles rather than fibers, or even if the polymer material is spun, a lot of beads are formed and the volatilization of the solvent is not performed well. As a result, during a calendering process of a web, the nanofiber web is melted and the pores are clogged. In addition, when the content of the polymer material exceeds 22.5 wt %, the viscosity increases and solidification takes place on the surface of the solution, which makes it difficult to perform spinning for a long time, and fiber diameter is increased so that a fibrous phase of equal to or less than a micrometer size cannot be formed.

In order to prepare a spinning solution, it is possible to use a single-component solvent, for example, dimethylformamide (DMF), as a solvent mixed with a polymer material. However, in the case that a 2-component solvent is used as a solvent that is used in the spinning solution, it is desirable to use a 2-component solvent that is obtained by mixing a solvent with a relatively high boiling point (BP) and a solvent with a relatively low boiling point (BP).

In the case of a 2-component solvent according to the present invention, it is preferable that a high boiling point solvent and a low boiling solvent are mixed at a weight ratio of about 7:3 to about 9:1. In the case that the high boiling point solvent is mixed at a weight ratio of less than 7, the polymer material does not dissolve completely. In the case that the high boiling point solvent is mixed at a weight ratio of more than 9, the low boiling point solvent is mixed too low at a weight ratio. As a result, evaporation of the solvent is not made well from the spun fiber, to thus cause formation of the web not to occur smoothly.

In the case that only a high boiling point solvent is used as a solvent, spinning is not made but spraying is made, to thus form particles not fibers. Otherwise, even if spinning is made, a lot of beads are formed and a solvent is not well evaporated. As a result, a nanofiber web will melt during performing a web lamination process, to thus cause a pore clogging phenomenon to occur.

In addition, in the case that only a low boiling point solvent is used as a solvent, evaporation of the solvent happens very quickly and thus many small fibers are produced in a needle of a spinning nozzle, to thereby act as a cause of a spinning trouble.

In the case that the polymer materials are PES and PVdF, respectively in the present invention, a solvent that is obtained by mixing, for example, DMAc (N,N-Dimethylacetoamide: BP-165° C.) as a high boiling point solvent, and acetone (BP-56° C.) as a low boiling point solvent at a weight ratio of about 9:1, may be used as the 2-component solvent. In addition, in the case that the polymer materials are PEI and PVdF, respectively, NMP (N-methylpyrrolidone: BP-202° C. to 204° C.) and THF (Terahydrofuran: BP-67° C.) may be mixed at a weight ratio of about 9:1 and used as the 2-component solvent.

In this case, a ratio of a mixture of the 2-component solvents and the whole polymer material is preferably set at a weight ratio of about 8:2.

A spinning solution that is obtained by mixing the polymer material and the solvent is electrospun by using a multi-hole spin pack, to then obtain a nanofiber web that is formed into a multi-layered structure. Then, a heat compression process, for example, a calendaring process is performed.

Here, a pore size of a nanofiber web may become about 0.8 μm or less by performing calendaring at about 70° C. to about 190° C. under a high-temperature and high-pressure condition.

In some embodiments, when a nanofiber web is formed, an amount of the accumulated nanofibers is set to 3 gsm to 15 gsm, and nanofibers having a low weight are accumulated, to thereby form a lightweight nanofiber web and bond the fabric substrate to a lightweight nanofiber web and to thus reduce the weight of the breathable waterproof fabric and the manufacturing cost thereof.

Figure 2:
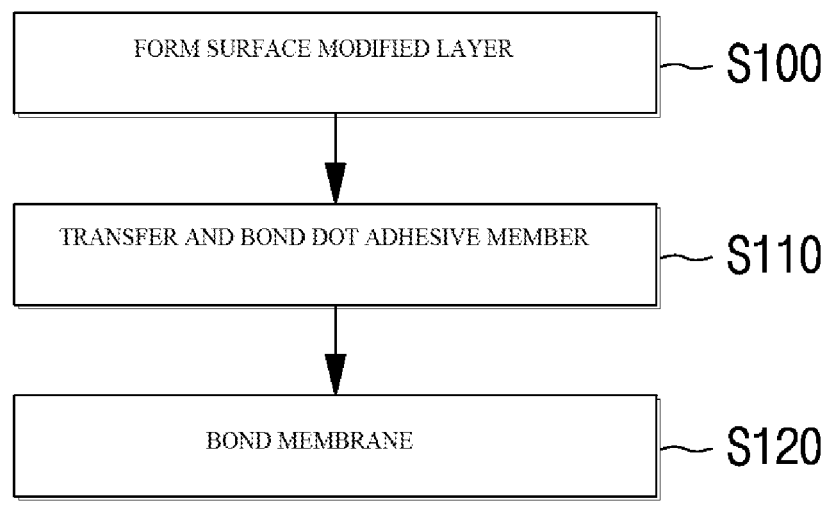
FIG. 2 is a flowchart of a method of manufacturing the breathable waterproof fabric according to the first embodiment of the present invention.

Referring to FIG. 2, the method of manufacturing a breathable waterproof fabric according to the first embodiment of the present invention, includes: forming a surface modified layer 201 on a bonding surface of a fabric substrate 200 (S100); transferring a dot adhesive member 110 to the surface modified layer 201 to bond one surface of the dot adhesive material 110 to the surface modified layer 201 of the fabric substrate 200 (S110); and thereafter, bonding a membrane 300 to the other surface of the dot adhesive member 110 (S120).

The surface modified layer 201 may be formed by various processes such as a corona treatment process and a plasma treatment process.

Figure 3:
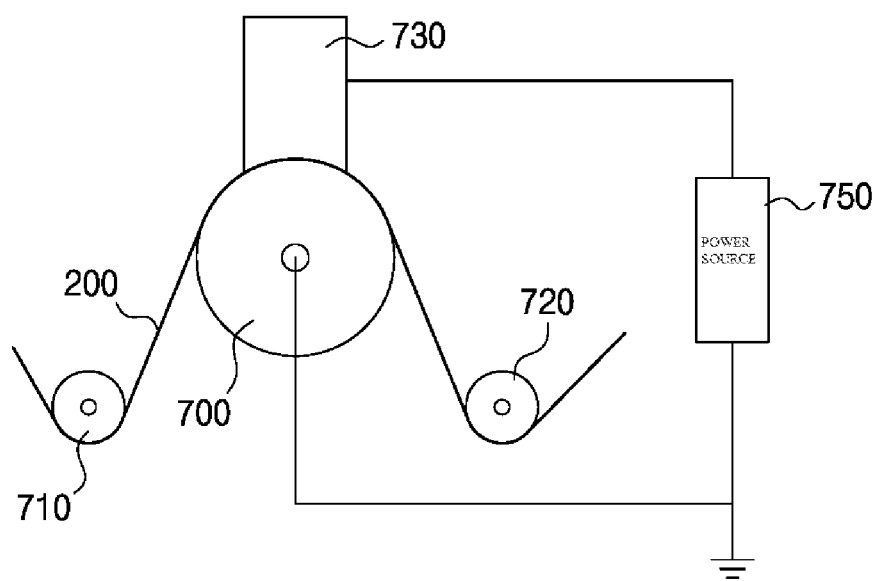
FIG. 3 is a construction diagram of an exemplary apparatus for forming a surface modified layer on a fabric substrate according to the present invention.

For example, the corona treatment can be performed by irradiating a corona discharge to the fabric substrate 200. As shown in FIG. 3, the fabric substrate 200 is fed to a processing roll 700, and a corona discharge generated by applying a high frequency or a high voltage between the processing roll 700 and a discharge electrode of a corona discharging unit 730 is irradiated to the fabric substrate 200.

Here, the corona discharge unit 730 receives the high frequency or high voltage from a power source 750, and the fabric substrate 200 guided by a first guide roll 710 is fed to the processing roll 700, and the corona discharge treated fabric substrate 200 is guided to a second guide roll 720 to be bonded with a dot adhesive member.

In some embodiments of the present invention, the corona discharge unit 730 is opposed to the processing roll 700, and immediately after the corona treatment is performed on the fabric substrate 200 fed to the processing roll 700, the dot adhesive member is bonded to the surface modified layer formed on the corona discharge treated fabric substrate 200 guided by the second guide roll 720.

That is, after the corona discharge is applied to the fabric substrate 200 to form the surface modified layer 201 on the fabric substrate 200, the fabric substrate 200 is guided by the second guide roll 720, and the dot adhesive member 110 is transferred and bonded to the surface modified layer 201. Accordingly, the dot adhesive member 110 is quickly bonded to the surface modified layer 201 of the fabric substrate 200 in a state in which the surface modification is maximally preserved, to thereby maximize the adhesive strength between the fabric substrate 200 and the dot adhesive member 110 to thus prevent the dot adhesive member 110 from being peeled off from the fabric substrate 200 and shorten the manufacturing process time.

Referring to FIGS. 4A and 4B, in the method of transferring and bonding the dot adhesive member according to an embodiment of the present invention, a dot adhesive member 110 is first transferred to a transfer auxiliary film 100 (FIG. 4A). Here, the transfer auxiliary film 100 is a film for transferring the dot adhesive member 110 to the fabric substrate 200 in a process described below. A polymer film can be used as the transfer auxiliary film 100. Typically, PET (polyethylene terephthalate) is preferably used as the polymer film.

Thereafter, the dot adhesive member 110 transferred to the transfer auxiliary film 100 is transferred to the surface modified layer 201 of the fabric substrate 200 (FIG. 4B).

Here, the operation of transferring the dot adhesive member 110 transferred to the transfer auxiliary film 100 to the fabric substrate 200 may include putting the fabric substrate 200 on the dot adhesive member 110 transferred to the transfer auxiliary film 100, thermally bonding the fabric substrate 200 to the dot adhesive member 110, and then peeling off the transfer auxiliary film 100 from the dot adhesive member 110, so that only the dot adhesive member 110 is left on the fabric substrate 200.

Here, when the transfer auxiliary film 100 and the fabric substrate 200 are thermally bonded by the dot adhesive member 110, the melted dot adhesive member 110 is bonded to only the surface of the transfer auxiliary film 100. However, since the fabric substrate 200 is a raw fabric made by woven yarn, there are a plurality of pores in the yarn, and thus the melted adhesive flows into the pores of the fabric substrate 200 including the surface modified layer 201 and is coated and bonded to the side walls of the pores, to thereby improve adhesive strength.

Therefore, the adhesive force between the transfer auxiliary film 100 and the dot adhesive member 110 is significantly lower than the adhesive force between the fabric substrate 200 and the dot adhesive member 110. Thus, when an operation of peeling off the transfer auxiliary film 100 from the dot adhesive member 110 by applying a predetermined physical force capable of maintaining a state where the dot adhesive member 110 is bonded to the fabric substrate 200, only the transfer auxiliary film 100 can be peeled off from the dot adhesive member 110.

The thickness t of the dot adhesive member 110 described above is preferably 30 µm to 50 µm.

Figure 5:
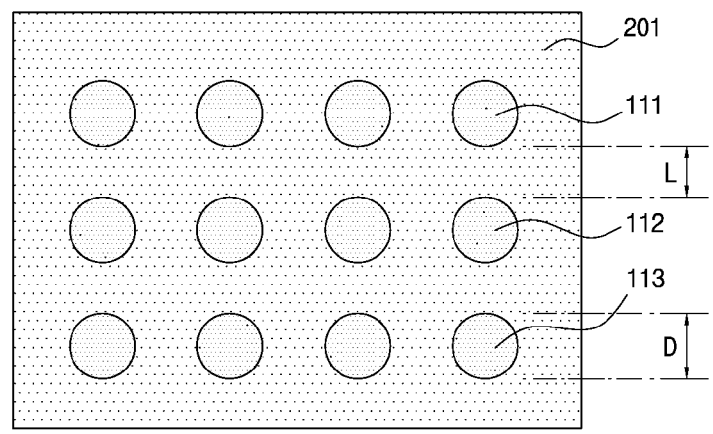
FIG. 5 is a plan view showing a state in which a dot adhesive member is bonded to a membrane of a breathable waterproof fabric according to the present invention.

FIG. 5 is a plan view showing a state in which a dot adhesive member is bonded to a membrane of a breathable waterproof fabric according to the present invention. The dot adhesive member is transferred and bonded to the surface modified layer 201 of the membrane, in which a plurality of dot-shaped adhesives 111, 112, and 113 are formed in a regularly spaced pattern.

In this case, the diameters D of the plurality of dot-shaped adhesives 111, 112 and 113 are preferably 100 µm to 500 µm, and the distances L between the plurality of dot-shaped adhesives 111 and 112 and the distances L between the plurality of dot-shaped adhesives 112 and 113 are preferably 100 µm to 400 µm.

When the diameters D of the dot-shaped adhesives 111, 112 and 113 and the distance L between the dot-shaped adhesives 111 and 112, and the distance L between the dot-shaped adhesives 112 and 113 are less than 100 µm, the amount of the dot adhesive member 110 is small and thus the adhesive force is decreased. When the diameters D of the dot-shaped adhesives 111, 112 and 113 exceed 500 µm, or the distance L between the dot-shaped adhesives 111 and 112, and the distance L between the dot-shaped adhesives 112 and 113 exceed 400 µm, the amount of the dot adhesive member 110 increases and the adhesive material penetrates into the fabric substrate 200 and the membrane 300. Therefore, the adhesive material escapes to the outside of the fabric or the pores of the membrane 300 are blocked by the adhesive material, to thus decrease a breathable waterproof function.

When the thickness t of the dot adhesive member 110 is less than 30 µm, the adhesive force decreases. When the thickness t exceeds 50 µm, the adhesive material penetrates into the fabric substrate 200 and the membrane 300, resulting in the same problem as a decrease in the breathable waterproof function.

Figure 6:
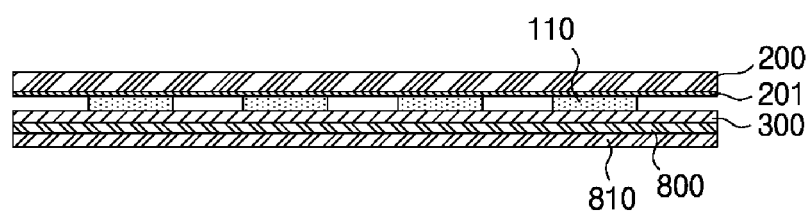
FIG. 6 is a cross-sectional view of a breathable waterproof fabric according to a second embodiment of the present invention.

Referring to FIG. 6, a breathable waterproof fabric according to a second embodiment of the present invention includes: a fabric substrate 200; a surface modified layer 201 formed on a bonding surface of the fabric substrate 200; a dot adhesive member 110 transferred to the surface modified layer 201 and whose one surface is bonded to the surface modified layer 201; a membrane 300 having one surface bonded to the other surface of the dot adhesive member 110; and a lining fabric substrate 810 bonded to the other side of the membrane 300 with an adhesive web 800 having perforations.

Here, the adhesive web 800 for bonding the membrane 300 and the lining fabric substrate 810 can be used as a sheeted hot-melt web.

The fabric substrate 200 and the lining fabric substrate 810 may be embodied by incorporating all materials for fabricating casual suits, sports suits, etc., as textiles including fabrics.

Since the fabric substrate 200 is exposed to the outside of the breathable waterproof fabric and the lining fabric substrate 810 is opposed to the human body, the weaving density of the lining fabric substrate 810 is relatively lower than that of the fabric substrate 100 that is exposed to the outside.

That is, when the breathable waterproof fabric is commercialized, the fabric substrate 200 is exposed to the outside and directly affects the appearance of the clothing made of fabrics, and thus has a relatively high density. However, the fabric substrate 810 is in proximity to the human body and is necessary to have only a limited function for protecting the membrane 300, and thus it is preferable to have a relatively low-density woven fabric in order to reduce the manufacturing cost. For this reason, the lining fabric substrate 810 may be referred to as a back fabric.

Figure 7:
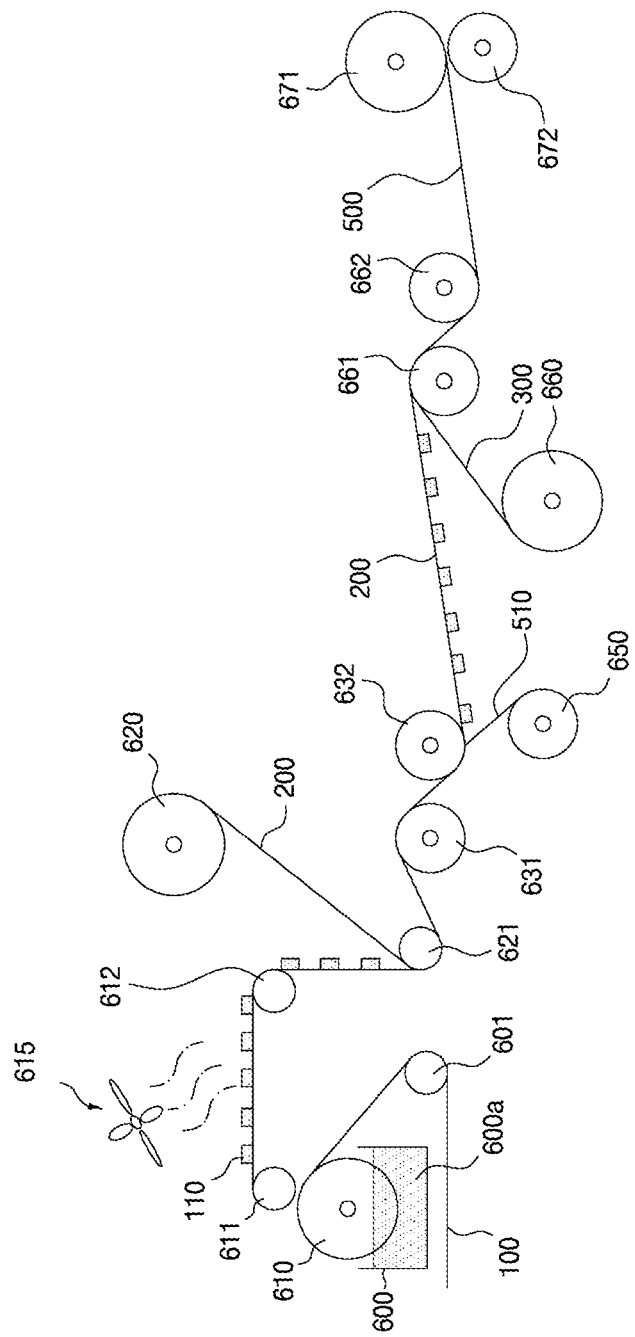
FIG. 7 is a construction diagram showing an apparatus for manufacturing a breathable waterproof fabric according to the present invention.

FIG. 7 is a construction diagram showing an apparatus for manufacturing a breathable waterproof fabric according to the present invention.

Referring to FIG. 7, an apparatus for manufacturing a breathable waterproof fabric according to the present invention includes a hot-melt adhesive tank 600, a transfer roll 610, a cooling fan 615, winding rolls 620, 650, 660, 671, and 672, heating rolls 631, 632, 661, and 662, and guide rolls 601, 611, 612, and 621.

The hot-melt adhesive tank 600 is a tank containing a melted hot-melt adhesive 600a. When the transfer roller 610 is rotated in a state where a part of the transfer roller 610 is contained in the hot-melt adhesive tank 600, the melted hot-melt adhesive 600a is applied to the roll surface of the transfer roller 610.

Here, a number of gravure coating holes (not shown) spaced apart from each other are formed on the roll surface of the transfer roll 610, and the melted hot-melt adhesive 600a is inserted and seated into the gravure coating holes.

The heating rolls 631, 632, 661 and 662 are installed to thermally bond the transferred dot adhesive member 110 to the fabric substrate 200 and to thermally bond the fabric substrate 200 and the membrane 300 with the dot adhesive member 110.

When reviewing the operation of the apparatus for manufacturing the breathable waterproof fabric having the above-described structure, the transfer roll 610 is first rotated, and thus the melted hot-melt adhesive of the hot-melt adhesive tank 600 is placed into the gravure coating holes on the roll surface of the transfer roll 610, the transfer auxiliary film 100 is brought into contact with the roll surface of the transfer roll 610 by the guide rolls 601 and 611, and the dot adhesive member 110 placed in the gravure coating holes by the rotating transfer roll 610 is transferred to the transfer auxiliary film 100.

Then, the dot adhesive member 110 transferred to the cooling fan 615 positioned between the guide rolls 611 and 612 is cooled and the fabric substrate 200 fed from the winding roll 620 by the guide roll 621 is laminated to the transfer auxiliary film 100 on which the dot adhesive member 110 has been transferred.

Then, the transfer auxiliary film 100 and the fabric substrate 200 that have been laminated with each other are thermally bonded to each other by the heating rolls 631 and 632, and then the transfer auxiliary film 100 is peeled off from the fabric substrate 200 to then be wound on a winding roll 650.

Subsequently, a membrane 300 supplied from a winding roll 660 is brought into contact with the dot adhesive member 110 of the fabric substrate 200 from which the transfer auxiliary film 100 has been peeled off so that the fabric substrate 200 and the membrane 300 are thermally bonded to each other by the heating rolls 661 and 662.

Here, the heating rolls 631, 632, 661 and 662 described above may be calendering rolls for applying heat and pressure and the thermal adhesion of the transfer auxiliary film 100 and the fabric substrate 200 or the fabric substrate 200 and the membrane 300 is performed via a laminating process of applying heat and pressure by thermal calendering rolls.

Meanwhile, in some embodiments of the present invention, a reference numeral 620 may be a winding roll on which a fabric substrate 200 is wound in which the surface modified layer 201 is formed on the fabric substrate 200. Alternatively, as shown in FIG. 3, the reference numeral 620 may also function as the second guide roll 720 for guiding the fabric substrate 200 on which the surface modified layer 201 is formed. In this case, the apparatus for manufacturing the breathable waterproof fabric further includes: the first guide roll 710, the processing roll 700, the corona discharge unit 730, and the like, shown in FIG. 3.

The breathable waterproof fabric according to the embodiments of the present invention described above has a structure in which the fabric substrate and the membrane are thermally bonded to each other by a dot adhesive member of a microdot-shaped pattern to this improve the adhesive force. It is possible to thermally bond the solid state dot adhesive member and the membrane in a state where the solid state dot adhesive member is in contact with the membrane, to thereby prevent the melted dot adhesive member from blocking the pores of the membrane, thereby preventing a decrease in a water-resistant pressure.

In addition, the breathable waterproof fabric according to the embodiments of the present invention is realized by bonding the membrane to the fabric substrate by using the membrane as a lightweight nanofiber web in which the lightweight nanofibers are accumulated, to thereby reduce the weight of the fabric.

In addition, the breathable waterproof fabric according to the embodiments of the present invention is made by employing a colorless, tasteless, and odorless thermoplastic hot-melt adhesive as a dot adhesive member, and by performing an environmentally friendly process that is harmless to the human body and excellent in air permeability and free from pollution, toxicity, and solvent-components, in which the fabric substrate and the membrane are bonded to each other with a pattern-shaped dot adhesive member, so that a phenomenon such as yellowing, contamination, bleaching or distortion does not occur.

Figure 8A:
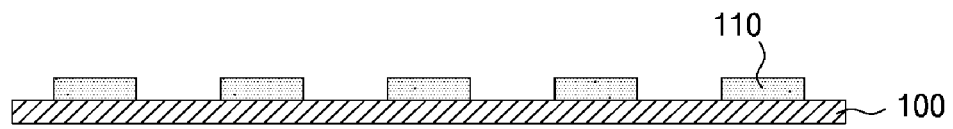
FIGS. 8A to 8C are cross-sectional views illustrating a method of manufacturing a breathable waterproof fabric of a two-layer structure by a transfer process according to the present invention.
Figure 8B:
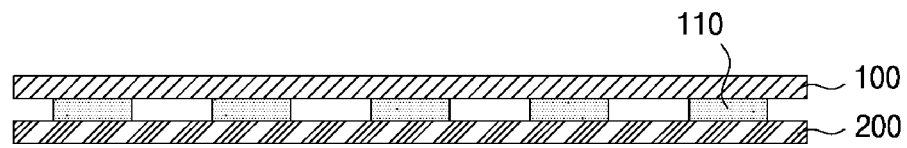
Figure 8C:
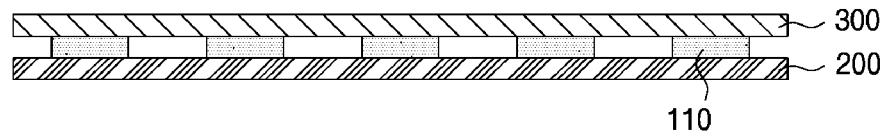

Referring to FIGS. 8A to 8C, a method of manufacturing a two-layer breathable waterproof fabric by employing a transferring process according to an embodiment of the present invention includes: transferring a dot adhesive member 110 to a transfer auxiliary film 100 (FIG. 8A); transferring the dot adhesive member 110 transferred to the transfer auxiliary film 100 to the fabric substrate 200 (FIG. 8B); and then, thermally bonding the membrane 300 and the dot adhesive member 110 after placing the membrane 300 on the dot adhesive member 110 transferred to the fabric substrate 200 (FIG. 8C).

Here, by the thermal adhesion, the dot adhesive member 110 is melted and permeated into the fabric substrate 200 and the membrane 300, and when the melted dot adhesive member 110 is cooled, the fabric substrate 200 and the membrane 300 are bonded to each other.

By performing such a method, a two-layer breathable waterproof fabric bonded to both the fabric substrate 200 and the membrane 300 with the dot adhesive member 110 can be produced.

In some embodiments of the present invention, the dot adhesive member 110 is positioned only on the local areas of the fabric substrate 200 and the membrane 300 by transferring the dot adhesive member 110 and thermally bonding the membrane 300 to the fabric substrate 200, and thus the breathable efficiency can be improved by reducing the bonded area between the fabric substrate 200 and the membrane 300 and increasing the area for performing the breathable function.

Meanwhile, in the conventional art, in the case where the liquid-phase adhesive is sprayed on the fabric substrate and then the membrane is bonded to the fabric substrate by heating and pressing the membrane with a heat roll, the distribution of the sprayed liquid-phase adhesive is uneven and the liquid-phase adhesive is concentrated and applied on the local area of the fabric substrate. Therefore, there is a problem that the breathable efficiency of the specific region of the fabric is relatively lowered, that is, the breathable efficiency is uneven, and the sprayed liquid-phase adhesive penetrates most regions of the fabric substrate and obstructs the breathable function of discharging moisture. However, in some embodiments of the present invention, there are technical features capable of solving the conventional problems.

Figure 9A:
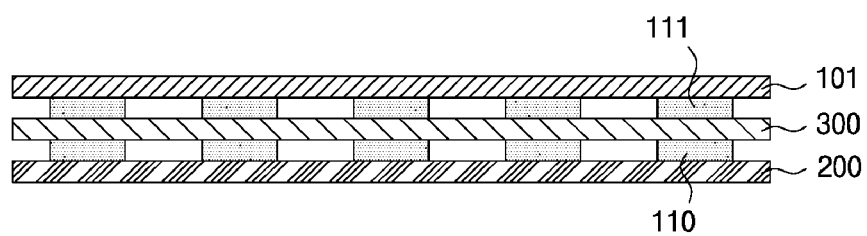
FIGS. 9A and 9B are cross-sectional views illustrating a method of manufacturing a breathable waterproof fabric of a three-layer structure by a transfer process according to the present invention.
Figure 9B:
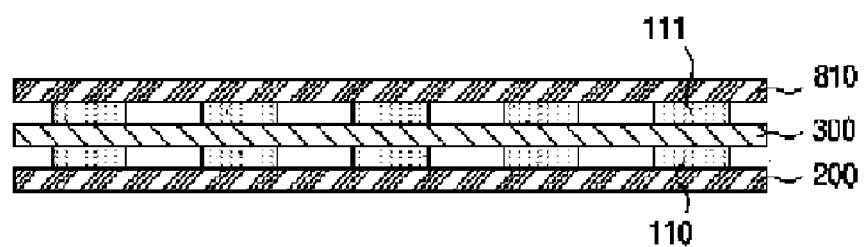

FIGS. 9A and 9B are cross-sectional views illustrating a method of manufacturing a breathable waterproof fabric of a three-layer structure by a transfer process according to the present invention.

After manufacturing the breathable waterproof fabric having a two-layer structure in which the membrane 300 has been bonded to the fabric substrate 200, a breathable waterproof fabric having a three-layer structure including the fabric substrate 200, the membrane 300 and a lining fabric substrate 810 can be manufactured.

In other words, the breathable waterproof fabric having the membrane 300 bonded to the fabric substrate 200 has been manufactured by performing a process shown in FIGS. 8A to 8C. Then, as shown in FIG. 9A, a dot adhesive member 111 transferred to a transfer auxiliary film 101 is transferred to the membrane 300.

Subsequently, the lining fabric substrate 810 is placed on the dot adhesive member 111 transferred to the membrane 300, to then thermally bond the lining fabric substrate 810 and the dot adhesive member 111 to each other (FIG. 9B).

Therefore, when the method according to the embodiment of the present invention is carried out by the transfer process, the fabric substrate 200, the membrane 300 and the lining fabric substrate 810 are bonded together by the dot adhesive members 110 and 111, to thereby obtain a breathable waterproof fabric.

Figure 10:
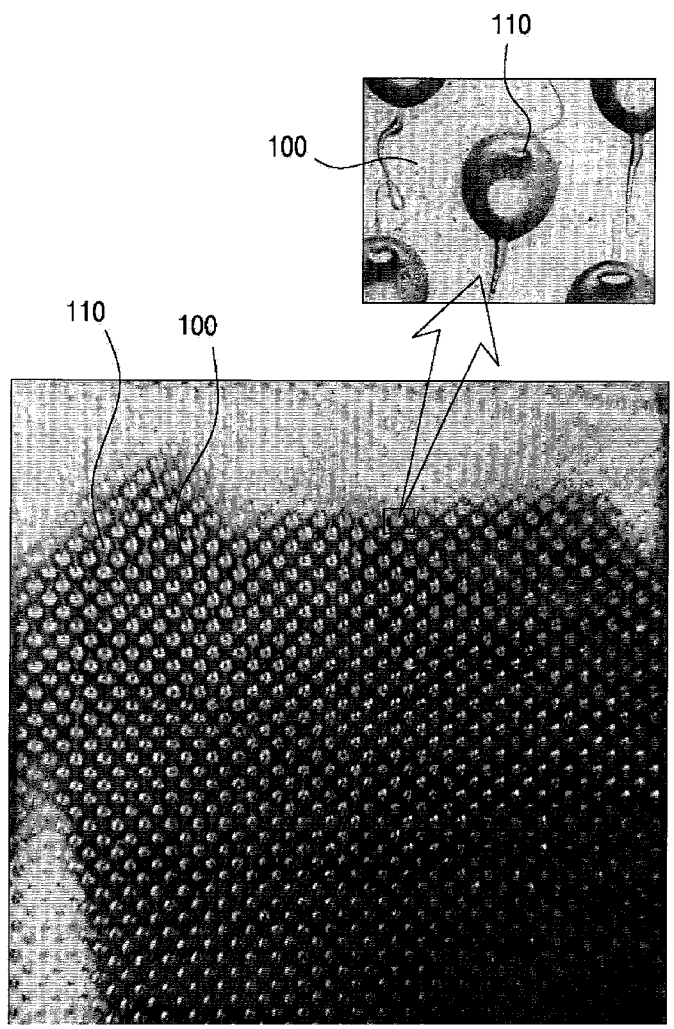
FIG. 10 is a photograph of a dot adhesive member transferred to a transfer auxiliary film according to the present invention.
Figure 11:
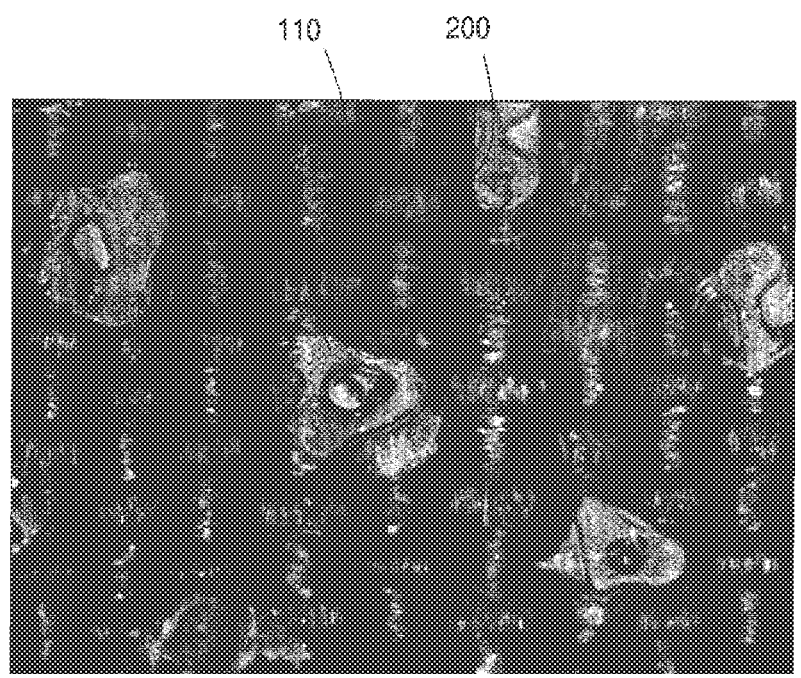
FIG. 11 is a photograph of a dot adhesive member transferred to a fabric substrate according to the present invention.

FIG. 10 is a photograph of a dot adhesive member transferred to a transfer auxiliary film according to the present invention, and FIG. 11 is a photograph of a dot adhesive member transferred to a fabric substrate according to the present invention.

As described above, in some embodiments of the present invention, a breathable waterproof fabric is formed by thermally bonding a fabric substrate and a membrane using a transferred dot adhesive member.

Here, as shown in FIGS. 10 and 11, the dot adhesive member 110 is well transferred to the transfer auxiliary film 100 and the fabric substrate 200, to thereby stably produce the breathable waterproof fabric according to the embodiments of the present invention.

Therefore, in some embodiments of the present invention, the fabric substrate and the membrane are thermally bonded with the transferred dot adhesive member, to thus reduce the bonded area between the fabric substrate and the membrane and increase the area for performing the breathable function, thereby improving the breathable efficiency.

In addition, in some embodiments of the present invention, since a microdot-shaped dot adhesive is thermally bonded to the fabric substrate and the membrane, the adhesive strength may be improved.

As described above, the breathable waterproof fabric according to the first embodiment of the present invention shown in FIG. 1 has the surface modified layer 201 formed on the bonding surface of the fabric substrate 200, in which the membrane 300 is bonded to the fabric substrate 200 by the dot adhesive member 110 transferred to the surface modified layer 201. Therefore, the adhesion strength between the fabric substrate 200 and the membrane 300 is improved.

Figure 12A:
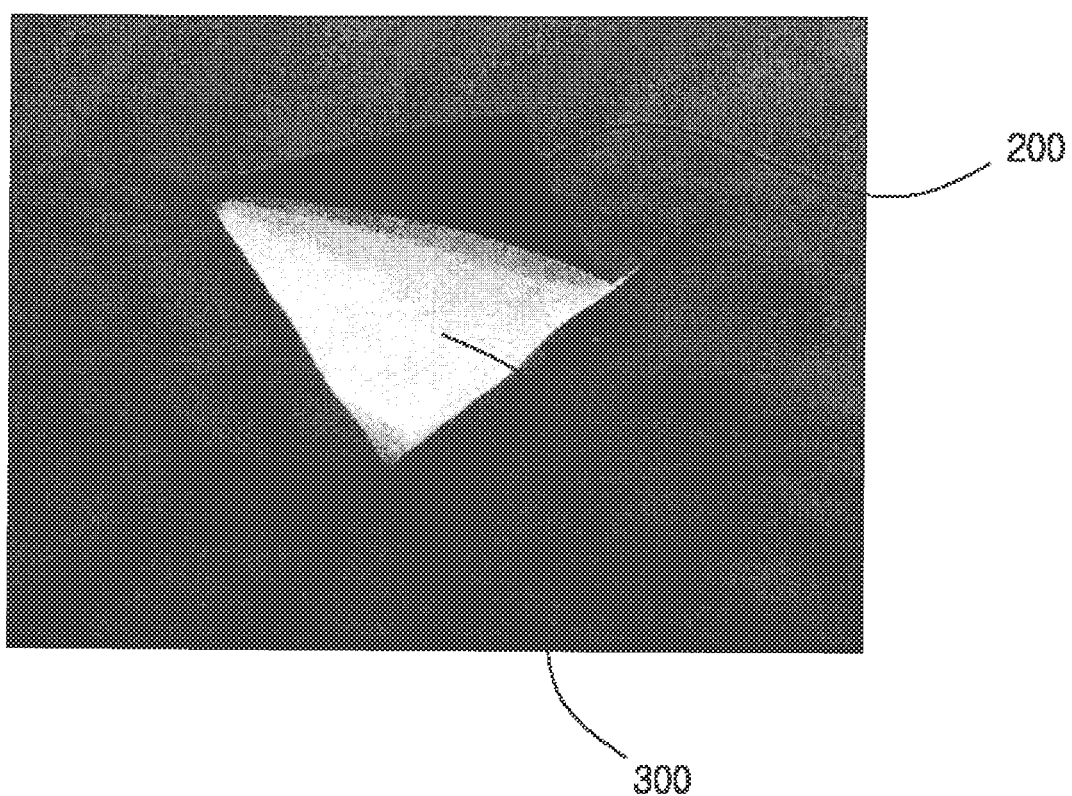
FIGS. 12A and 12B are photographs of the breathable waterproof fabric taken in a state of being peeled off, according to an embodiment of the present invention and a comparative example, respectively.
Figure 12B:
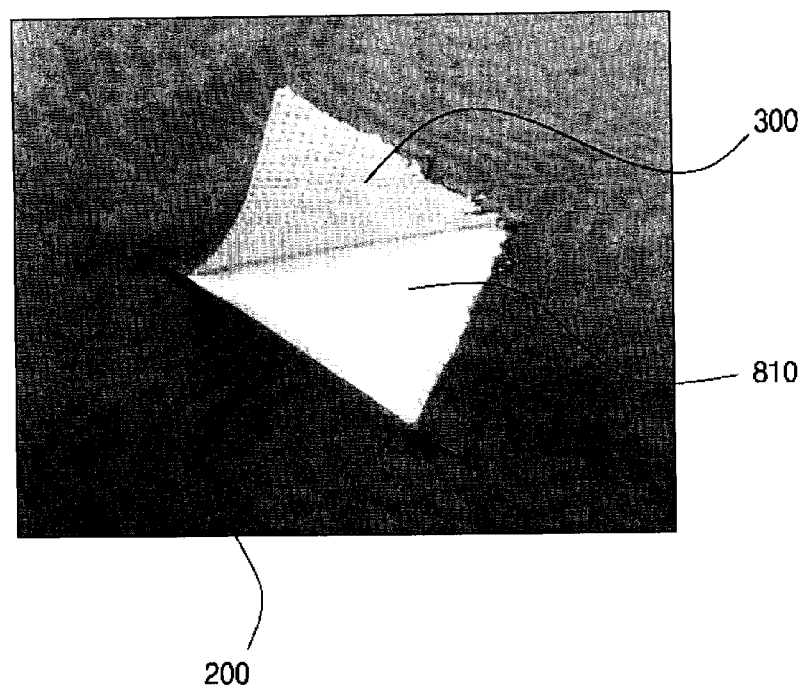

FIG. 12A illustrates a breathable waterproof fabric according to a comparative example in which one surface of a membrane 300 is bonded to a fabric substrate 200 on which a surface modified layer is not formed and a lining fabric substrate 810 is bonded to the other side of the membrane 300, and FIG. 12B illustrates a breathable waterproof fabric according to the first embodiment of the present invention in which one surface of a membrane 300 is bonded to a fabric substrate 200 on which a surface modified layer is formed with a dot adhesive member 110 transferred to the fabric substrate 200 and a lining fabric substrate 810 is bonded to the other side of the membrane 300.

The breathable waterproof fabrics according to the comparative example and the first embodiment of the present invention were washed and dried for 24 hours, and then a part of the fabrics were cut and peeled off with an identical physical force. As a result, in the case of the breathable waterproof fabric according to the comparative example, the fabric substrate 200 was peeled off from the membrane 300 as shown in FIG. 12A, while in the case of the breathable waterproof fabric according to the first embodiment of the present invention, the fabric substrate 200 and the membrane 300 were peeled off from the lining fabric substrate 810 in a state where the fabric substrate 200 and the membrane 300 were bonded to each other, as shown in FIG. 12B.

That is, the breathable waterproof fabric according to the first embodiment of the present invention provided with the surface modified layer is much superior in adhesion between the fabric substrate 200 and the membrane 300 than the breathable waterproof fabric according to the comparative example in which the surface modified layer is not provided.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention is applied to a breathable waterproof fabric capable of improving adhesion strength and breathable efficiency between a fabric substrate and a membrane by bonding the fabric substrate and the membrane by using a transferred dot adhesive member and forming a surface modified layer on a bonding surface of the fabric substrate.

What is claimed is:
1. A method of manufacturing a breathable waterproof fabric, the method comprising:
preparing a first fabric substrate;
surface-treating one surface of the first fabric substrate to form a surface modified layer in the first fabric substrate;
preparing a dot adhesive member formed on a transfer auxiliary film;
transferring the dot adhesive member to the surface modified layer of the first fabric substrate in such a way that one surface of the dot adhesive member is bonded to the surface modified layer;
preparing a membrane formed of a nanofiber web, wherein the nanofiber web is prepared by electrospinning a spinning solution to form electrospun and laminated nanofibers, the spinning solution being a mixture of a polymer material and a solvent; and
bonding the membrane to the other surface of the dot adhesive member, one surface of the membrane being attached to the first fabric substrate by the dot adhesive member.

2. The method of manufacturing the breathable waterproof fabric of claim 1, further comprising: bonding a second fabric substrate to the other surface of the membrane using an adhesive web having pores, after bonding the membrane.

3. The method of manufacturing the breathable waterproof fabric of claim 1, wherein the surface-treating is performed by a corona treatment process or a plasma treatment process.

4. The method of manufacturing the breathable waterproof fabric of claim 1, wherein the surface-treating is performed by an irradiation process of irradiating a corona discharge to the one surface of the first fabric substrate, wherein the corona discharge is generated by applying a high frequency or a high voltage between a processing roll and a discharge electrode of a corona discharging unit while feeding the first fabric substrate to the processing roll.

5. The method of manufacturing the breathable waterproof fabric of claim 4, wherein the transferring is performed by guiding the first fabric substrate irradiated with the corona discharge using a guide roll.

* * * * *